United States Patent
Miyauchi

(10) Patent No.: US 11,012,698 B2
(45) Date of Patent: May 18, 2021

(54) IMAGE ENCODING APPARATUS AND METHOD FOR CONTROLLING THE SAME

(71) Applicant: CANON KABUSHIKI KAISHA, Tokyo (JP)

(72) Inventor: Dai Miyauchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/271,941

(22) Filed: Feb. 11, 2019

(65) Prior Publication Data

US 2019/0253716 A1 Aug. 15, 2019

(30) Foreign Application Priority Data

Feb. 13, 2018 (JP) .............................. JP2018-023404

(51) Int. Cl.
| | |
|---|---|
| *H04N 19/142* | (2014.01) |
| *H04N 19/172* | (2014.01) |
| *H04N 19/87* | (2014.01) |
| *H04N 19/126* | (2014.01) |
| *G11B 20/00* | (2006.01) |
| *H04N 19/63* | (2014.01) |
| *H04N 19/186* | (2014.01) |
| *H04N 19/176* | (2014.01) |

(52) U.S. Cl.
CPC ..... *H04N 19/142* (2014.11); *G11B 20/00007* (2013.01); *H04N 19/126* (2014.11); *H04N 19/172* (2014.11); *H04N 19/176* (2014.11); *H04N 19/186* (2014.11); *H04N 19/63* (2014.11); *G11B 2020/00072* (2013.01)

(58) Field of Classification Search
None
See application file for complete search history.

(56) References Cited

U.S. PATENT DOCUMENTS

| | | | | |
|---|---|---|---|---|
| 2014/0376886 | A1* | 12/2014 | Pettersson | H04N 5/93 386/241 |
| 2017/0155902 | A1* | 6/2017 | Suzuki | H04N 19/63 |
| 2019/0297327 | A1* | 9/2019 | Mao | H04N 19/124 |

FOREIGN PATENT DOCUMENTS

JP 2011-061534 A 3/2011

\* cited by examiner

*Primary Examiner* — Christopher Braniff
(74) *Attorney, Agent, or Firm* — Cowan, Liebowitz & Latman, P.C.

(57) ABSTRACT

The invention generates encoded data in which image quality degradation of regions of the frame of interest that have not been encoded is suppressed. For this, an apparatus comprises a quantizing unit which quantizes image data of a frame in accordance with a quantization parameter, every predetermined block set in advance, an encoding unit which encodes quantized data, a quantization control unit which controls the quantization parameter such that a code amount approaches a target code amount, and a scene change detecting unit which detects a scene change. The quantization control unit has at least two control methods, applies a first quantization control method when starting encoding of a frame, and, in a case where the scene change detecting unit detects a scene change, switches to a second quantization control method from the first quantization control method.

10 Claims, 14 Drawing Sheets

1 BLOCK LINE = Lv1:4 LINES, Lv2:2 LINES, Lv1:1 LINE

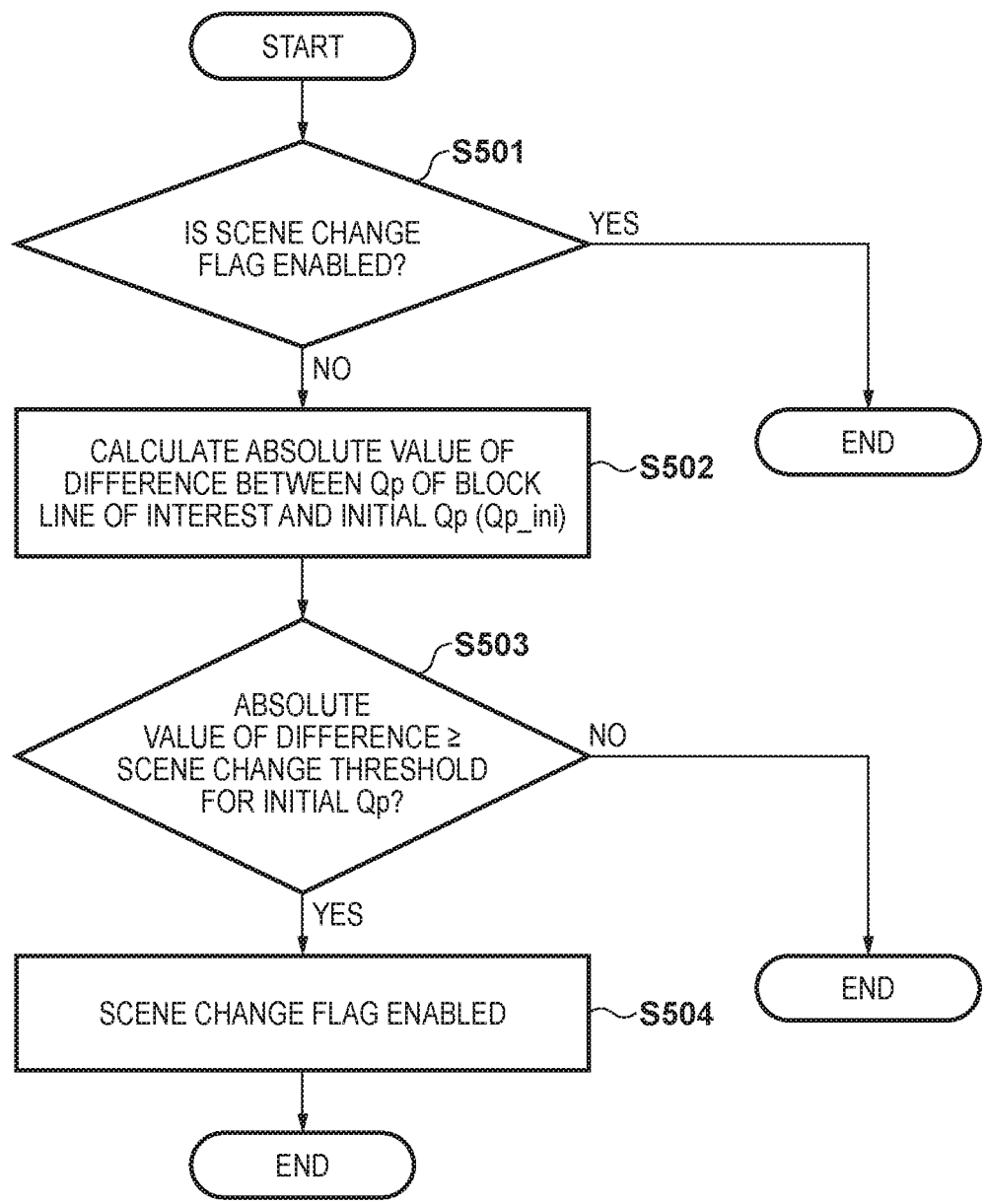

IMAGE ENCODING APPARATUS AND METHOD FOR CONTROLLING THE SAME

BACKGROUND OF THE INVENTION

Field of the Invention

The present invention relates to a technology for encoding moving images.

Description of the Related Art

Currently, digital image capturing apparatuses that record moving images, such as digital camcorders and the like, are widely available, and, in recent years, methods for recording RAW images have also been applied to moving images as well as still images. RAW images require a huge amount of data in recording, but are able to keep correction and degradation of the original image to a minimum, and post-shooting images can be edited with a high degree of freedom. Thus, RAW image recording is preferentially used especially by advanced users among those who use image capturing apparatuses.

At the time of moving image recording of a RAW image, compression encoding for compressing the data amount to a desired code amount is required, so as to enable moving images of fixed length to be recorded on a predetermined recording medium. A RAW image is constituted by a Bayer array in which the colors R, G and B are arranged in a mosaic manner. The adjacent pixels in a Bayer array have low inter-pixel correlation because of the color components of these colors being different. Hence, it is difficult to obtain high compression efficiency even if the image data is directly encoded. In view of this, pixels of the same color component are extracted from the RAW image and multiple planes are generated. A plane transformation technology for enhancing correlation between pixels within a plane to improve compression efficiency by performing encoding on a plane-by-plane basis is then generally utilized as one compression encoding technique.

Also, H264 (H.264/MPEG-4 Part 10: Advanced Video Coding) is conventional known as a typical compression encoding method. With this compression encoding method, the data amount is compressed in blocks consisting of a predetermined number of pixels within a frame, utilizing the time redundancy and space redundancy inherent in moving images.

In H.264, compression encoding is realized by combining technologies such as motion detection and motion compensation for time redundancy, the discrete cosine transform (DCT) as frequency transformation for space redundancy, and also quantization and entropy encoding. When the compression ratio is raised above a certain level, however, block distortion specific to DCT becomes marked, and image degradation becomes subjectively noticeable.

In view of this, a sub-band coding technology using the discrete wavelet transform (DWT) which involves respectively applying low-pass and high-pass filtering horizontally and vertically and disassembling image data into frequency bands called sub-bands is employed in JPEG 2000 and the like. Compared with encoding technologies using DCT, this sub-band coding is characterized by being resistant to block distortion and having favorable compression characteristics at high compression.

In addition to technology such as the above, code amount control is performed in compression encoding, in order to compress the code amount to a desired code amount. Typical code amount control involves determining a target code amount of the frame to be encoded next on the basis of information on frames that have been encoded. In order to converge the produced code amount to the target code amount per frame, the code amount is then controlled by performing quantization control for changing a quantization parameter Qp that is utilized in quantization every predetermined unit of the image, such that the absolute value of the coded amount difference (value calculated by subtracting the target code amount from the produced code amount) decreases. Even though the code amount that is produced can be reduced as the quantization parameter Qp increases, the degree of image quality degradation increases. Thus, the quantization parameter Qp can be said to be a parameter that is desirably as small as possible, and uniform within the screen.

The images are generally highly correlated between frames that are temporally adjacent. In other words, the frame of interest to be used in encoding is highly correlated with the previous frame that has been encoded and is temporally adjacent. In view of this, consider the case where it is known that the encoding difficulty of the previous frame is high on the screen upper side and low on the screen lower side, for example. This will be the case when, for example, the upper part of the previous frame has a large amount of high frequency component and the lower part is comparatively flat and does not include high frequency component. In this case, by assuming that the frame of interest has similar tendencies, and increasing the target code amount of the upper part of the frame of interest and decreasing the target code amount of the lower part, the variation (difference) in the quantization parameter Qp between e upper part and lower part of the image can be reduced. Performing code amount control on the frame of interest (current frame) in accordance with the encoding result of the previous frame in this way will, henceforth, be referred to as feed-back control.

However, correlation is not necessarily high between frames of a moving image. For example, correlation between frames is low in scenes such as those where a flash goes off externally or those involving intense movement.

In view of this, with conventional encoding technologies including H.264, a configuration is adopted in which a frame buffer is provided, and encoding can be started after first investigating the correlation between a frame that has already been encoded and the frame of interest. Such control will henceforth be referred to as feed-forward control. If teed-forward control can be utilized, quantization control with little variation in Qp becomes possible, even when the correlation between frames is low.

However, real-time processing is required on input moving images, and in a system that cannot perform prior analysis before encoding from the viewpoint of the resource, the aforementioned feed-back control must be relied on, even in the case Where the correlation between frames is low.

Here, description will be given taking the problems that arises in the case where correlation between the frames in a feed-back control system is low as an example.

Assume that the encoding difficulty on the upper side of the screen of the frame immediately previous to the frame of interest is a high, and on the lower side is low. With regard to the frame of interest, assume that the encoding difficulty on the upper side of the screen is low, and on the lower side is high. Because the reference frame of feed-back control is the immediately previous frame, in the case of encoding the frame of interest, the target code amount will be increased on the screen upper side and decreased on the screen lower side.

This allocation of the target code amount will result in less code amount than expected being produced on the upper side of the screen in the frame of interest, and thus control will be performed the quantization parameter Qp decreases. On the other hand, more code amount than expected is produced on the lower side of the screen, and thus control will be performed such that the quantization parameter Qp increases. In other words, there will be a large change in the quantization parameter Qp within the one screen.

Based on the above, in code amount control of moving images without feed-forward control, the control method at the time of scene changes discussed later is desirably devised in some way, and in order to realize this it is necessary to detect scene changes while encoding frames of interest. Note that, in subsequent description, the encoding difficulty differs between frames of images including partially, and the relationship between frames in which the controllability of the code amount and the quantization parameter Qp can deteriorate is called a scene change in the broad sense of a scene change.

In view of such issues, Japanese Patent Laid-Open No. 2011-61534 describes a technology for estimating, from the number of unit regions that are included in a slice and the slice code amount, the code amount of compression-encoded data in the case where compression of a subsequent slice is performed using the same quantization parameter Qp as the quantization parameter Qp used at the time of compression, judging whether there has been a scene change, by the estimated code amount and the picture target code amount, and improving the code amount controllability of subsequent regions.

According to Japanese Patent Laid-Open No. 2011-61534, a scene change is judged through comparison of the predicted code amount and the picture target code amount (equivalent to the predicted value of the code amount difference). The code amount of the image can then be suppressed, by changing to Qp of the minimum guaranteed image quality after detection, through scene change detection using the code amount. However, with the technology described in Japanese Patent Laid-Open No. 2011-61534, a scene change will not be recognized if the produced code amount does not diverge from the target code amount.

Here, the control sensitivity of the quantization parameter Qp per frame will be referred to below. First, the control sensitivity of the quantization parameter Qp is defined as a parameter according to which the produced code amount converges further to the target code amount as the value of the control sensitivity increases, whereas the quantization parameter Qp varies more within the frame. As aforementioned, the quantization parameter Qp is a parameter according to which more favorable image quality is achieved as the quantization parameter Qp becomes more uniform, although there is a trade off with the convergence of the produced code amount.

Since code amount control is able to allow an increase or decrease in the code amount on a frame-by-frame basis in a range in which real-time reproduction processing can be performed according to the capacity of the data buffer for decoding, setting the quantization parameter Qp to a high control sensitivity and raising the convergence of the code amount on a frame-by-frame basis is not necessarily required.

However, when the produced code amount exceeds the target code amount by too much in one frame, the produced code amount of subsequent frames will need to be suppressed, thus leading to concern about image quality degradation in the frame of interest onward. There is also concern about an increase in flicker affecting image quality, in the case where the code amount differs greatly between frames. Also, from the viewpoint of the editability of moving images, code amount control is unsuitable for cases where CBR (constant bit rate) control is required or for realizing functions such as clipping a single still image from a moving image for which there has been a growing need in recent years. Based on the above, it is thought that code amount control in which the control sensitivity of the quantization parameter Qp is high will be increasingly required from now on.

Returning to Japanese Patent Laid-Open No. 2011-61534, in a system with high control sensitivity, the produced code amount tends to approximate the target code amount, even in the case where the correlation between frames is low. For this reason, in a system in which the control sensitivity is high, scene changes cannot be accurately detected with the technology of Japanese Patent Laid-Open No. 2011-61534.

Since the produced code amount converges to the target code amount, it would appear unnecessary to detect scene changes, but since the quantization parameter Qp changes greatly within the screen, even when the produced code amount approximates the target code amount, a problem arises in that image quality becomes unstable.

It should be clear from the above that to perform encoding with higher image quality, a mechanism for stabilizing the image quality will be needed in the case of scene changes in which the quantization parameter p varies greatly, regardless of the produced code amount converging to the target code amount.

SUMMARY OF THE INVENTION

The present invention, in view of the above problems, provides a technology for generating encoded data in which image quality degradation in regions of the frame of interest that have not been encoded is suppressed, by inferring a scene change according to the variation of the quantization parameter within a frame, and switching the method for determining the quantization parameter after detection of the scene change from the method used before.

According to an aspect of the invention, there is provided an image encoding apparatus for encoding moving image data captured by an image capturing unit, comprising: a quantizing unit configured to quantize image data of a frame in the moving image data in accordance with a quantization parameter, every predetermined block set in advance; an encoding unit configured to encode quantized data obtained by the quantizing unit; a quantization control unit configured to control the quantization parameter such that a code amount produced by the encoding unit approaches a target code amount; and a scene change detecting unit configured to detect whether there is a scene change in at least part of a frame, wherein the scene change detecting unit detects a scene change according to a relationship between a quantization parameter of a block of a frame determined by the quantization control unit and a quantization parameter at a start of encoding of the frame, and the quantization control unit has at least two control methods, applies a first quantization control method when starting encoding of a frame, and, in a case where the scene change detecting unit detects a scene change, switches to a second quantization control method that differs from the first quantization control method.

According to the present invention, it becomes possible to generate encoded data in which image quality degradation of regions of the frame of interest that have not been encoded is suppressed, by interring a scene change according to the variation of the quantization parameter within a frame, and switching the method for determining the quantization parameter after detection of the scene change from the method used before.

Further features of the present invention will become apparent from the following description of exemplary embodiments (with reference to the attached drawings).

BRIEF DESCRIPTION OF THE DRAWINGS

FIG. 5 is a processing flowchart of a scene change detecting unit according to the first embodiment.

DESCRIPTION OF THE EMBODIMENTS

Hereinafter, embodiments of the present invention will be described in detail in accordance with the attached drawings.

First Embodiment

Configuration

Figure 1:
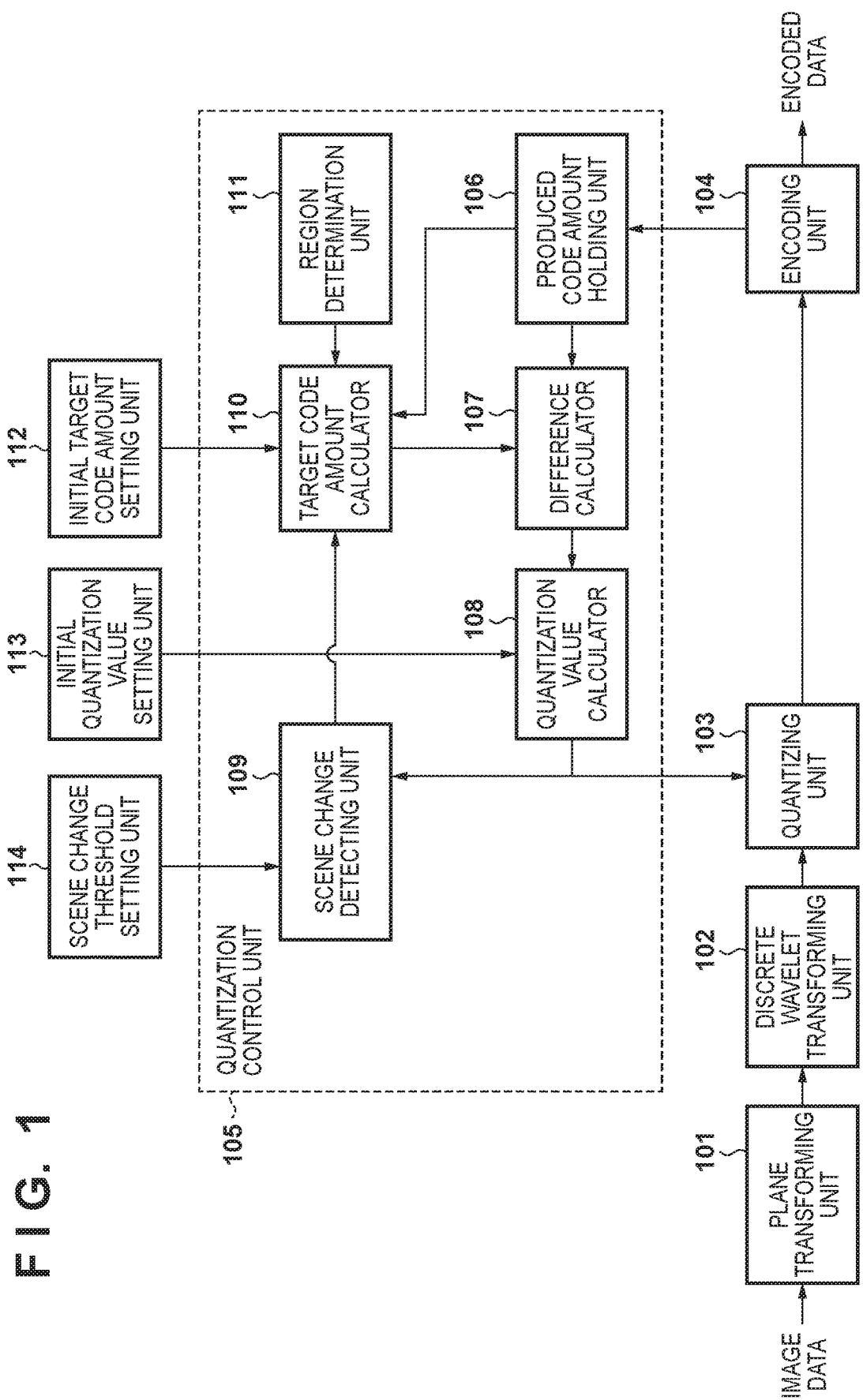
FIG. 1 is a block diagram showing an exemplary configuration of an image encoding apparatus according to a first embodiment.

FIG. 1 is a block diagram showing an exemplary configuration of an image encoding apparatus according to the first embodiment. This image encoding apparatus is assumed to be incorporated in an image capturing apparatus such as a digital camcorder, for example. In other words, moving image data for encoding is assumed to be supplied from an image capturing unit (not shown).

Plane Transforming Unit

Figure 2:
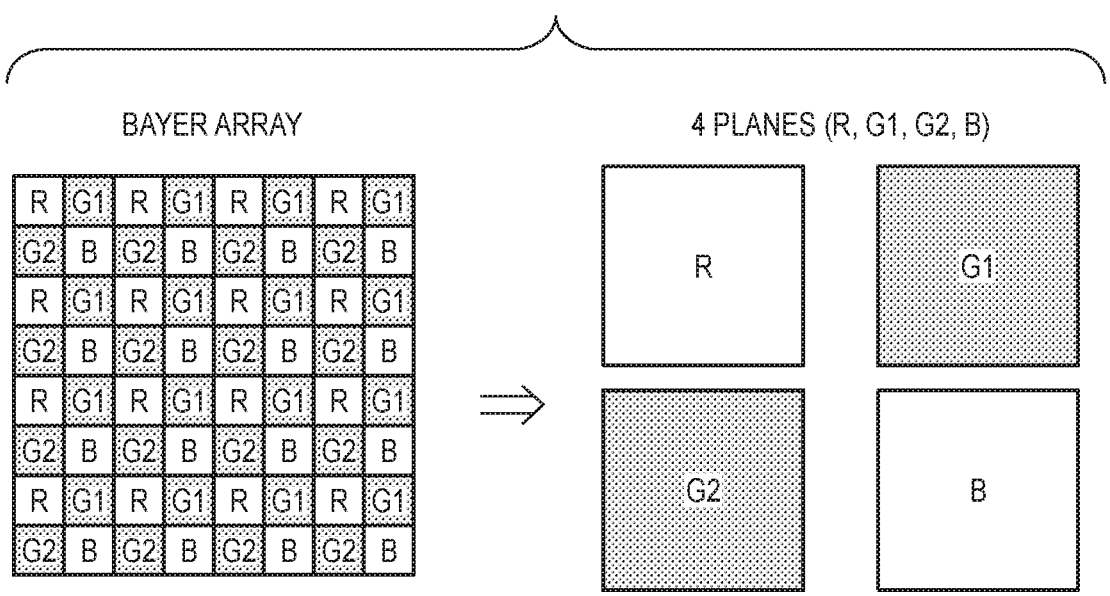
FIG. 2 is a plane formation diagram of when a Bayer array is separated into four planes consisting of RGB according to the first embodiment.

A plane transforming unit 101 separates image data input from the image capturing unit into a plurality of planes. In the present embodiment, the input image data is a RAW image in a Bayer array. FIG. 2 is a plane formation diagram of when a Bayer array serving as the input image data is separated into four planes, namely, an R plane that is constituted by only R component, a G1 plane that is constituted by only G1 component, a G2 plane that is constituted by only G2 component, and a B plane that is constituted by only B component. Adjacent pixels within a RAW image in a Bayer array have a low correlation and are unsuitable for compression encoding, due partly to differences in the color components represented by these pixels. In this respect, by performing plane transformation, one plane serves as a single component, and correlation between adjacent pixels is also high, and thus high compression efficiency can be expected.

Discrete Wavelet Transforming (DWT) Unit

A discrete wavelet transforming unit 102 generates a transform coefficient by transforming the image represented by the planes that are output by the plane transforming unit 101 into a frequency region signal. The number of times DWT is executed not particularly limited, and is given as three times in the embodiments.

Figure 3:
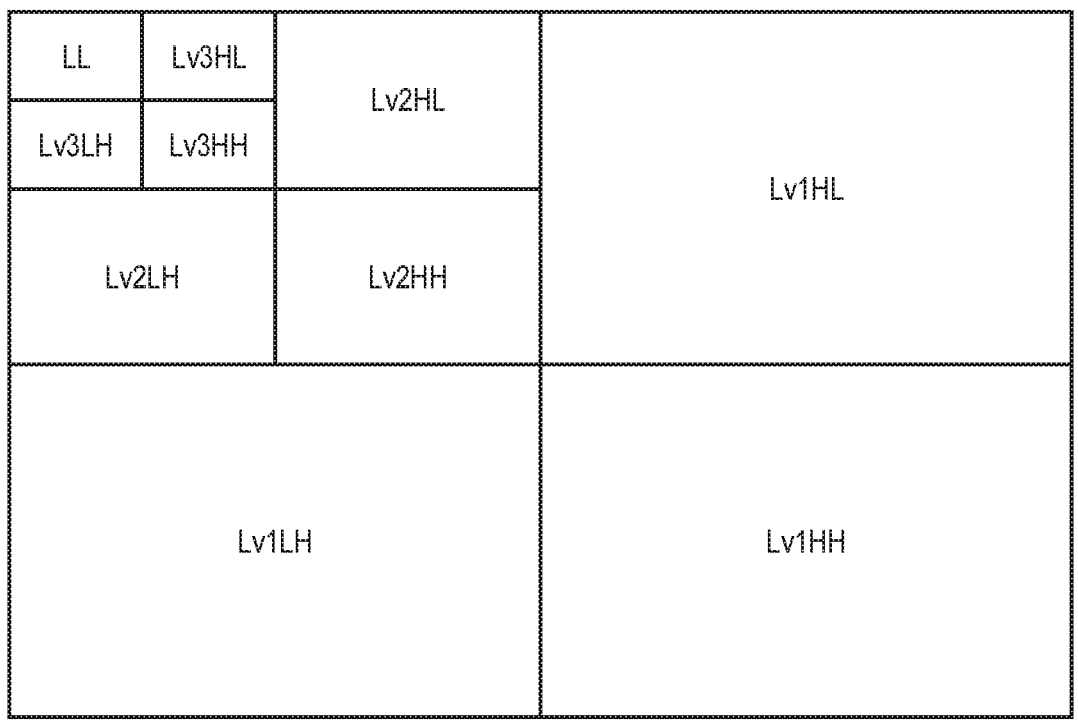
FIG. 3 is a sub-band formation diagram of when vertical and horizontal filtering of the discrete wavelet transform (DWT) according to the first embodiment are each performed three times.

FIG. 3 is a sub-band formation diagram that is obtained in the case where DWT in which vertical and horizontal filtering processing are taken as one set is executed three times. In the diagram, "L" and "H" respectively indicate low and high frequencies, and the order thereof indicates, on the former side, bands that result from performing horizontal filtering, and, on the latter side, bands that result from performing vertical filtering. The number after "Lv" indicates the disassembly level of DWT. In the case where DWT is performed two times or more, a sub-band LL which is the low frequency band obtained in the previous transformation will be the transformation target. Hence, the horizontal and vertical of the sub-band that was previously transformed are both reduced in size by half, as the number of executions of DWT mount up. Also, for this reason, the sub-band LL remains at the last execution of DWT, and thus it is normal not to give notation representing the disassembly level as in FIG. 3.

Although DWT generally involves filtering being performed on the entire image, it is possible to perform vertical and horizontal filtering at the timing at which several filter taps worth of pixels have accumulated in memory. Accordingly, it is possible to process the sub-bands in parallel, by performing DWT in units of one line of plane data and further applying DWT recursively to the generated low-frequency sub-bands.

Note that although the discrete wavelet transforming unit 102 in the embodiments executes DWT in order on the four planes generated from the frame of interest (RAW image) for encoding, a plurality of discrete wavelet transforming units 102 may be provided in order to shorten the processing time. For example, in the case where two discrete wavelet transforming units 102 are provided in parallel, the load related to DWT is halved compared with the case where one is provided, and the tune related to transformation can also be halved. Also, in the case where four discrete wavelet transforming units 102 are provided in parallel, it is possible to decrease the time related to DWT to quarter compared with the case where one is provided.

In the description of the present embodiment, whenever one line of transform coefficients is generated in each sub-band, the discrete wavelet transforming unit 102 sequentially outputs the lines of transform coefficients of the sub-bands to a quantizing unit 103.

Quantization Unit

The quantizing unit 103 quantizes the transform coefficients on a coefficient-by-coefficient basis, utilizing a quantization parameter Qp generated by the quantization control unit 105. Note that the quantization parameter Qp is a parameter according to which the quantized value decreases as the value of the quantization parameter increases, enabling a reduction in the code amount, although image quality degradation becomes more marked. Also, quantization of the transform coefficients of the four planes may be performed on a plane-by-plane basis or may be performed for all of the planes in parallel, and it is assumed that the quantizing unit 103 quantizes the same sub-band in each plane and the transform coefficient of the same position with a common quantization parameter Qp, and that the quantization result is supplied to an encoding unit 104.

Encoding Unit

The encoding unit 104 performs entropy encoding of the transform coefficients of each plane quantized by the quantizing unit 103, and generates and outputs encoded data.

Initial Setting

An initial target code amount setting unit 112 sets a target code amount for each region at the start of encoding of the frame of interest (RAW image of interest), which will be discussed later in relation to region division. An initial quantization value setting unit 113 sets the quantization parameter Qp at the start of encoding of the frame of interest. A scene change threshold setting unit 114 sets a threshold to be used in detection of whether or not there has been a scene change by a scene change detecting unit 109 discussed later. Note that the various setting values at the start of encoding are generally calculated by feed-back control on the basis of the encoding information of the previous frame.

Quantization Control

Next, a quantization control unit 105 in the embodiments will be described. The quantization control unit 105 controls the quantization parameter Qp, such that the produced code amount of the frame of interest converges to the target code amount of the frame of interest.

In the embodiments, four planes are separated from the RAW image of one frame, the discrete wavelet transform is performed on each plane, and quantization and encoding are performed. A common quantization parameter Qp is used when quantizing the four planes if type of sub-band is the same, and the position at which the quantization parameter Qp is updated is also the same. This is because of updating the quantization parameter Qp that is used in common, based on the code amount of the frame of interest (code amount for four planes)

Unit of Control

Next, the above regions in the embodiments and the unit of control of the quantization parameter Qp will be described.

Figure 4A:
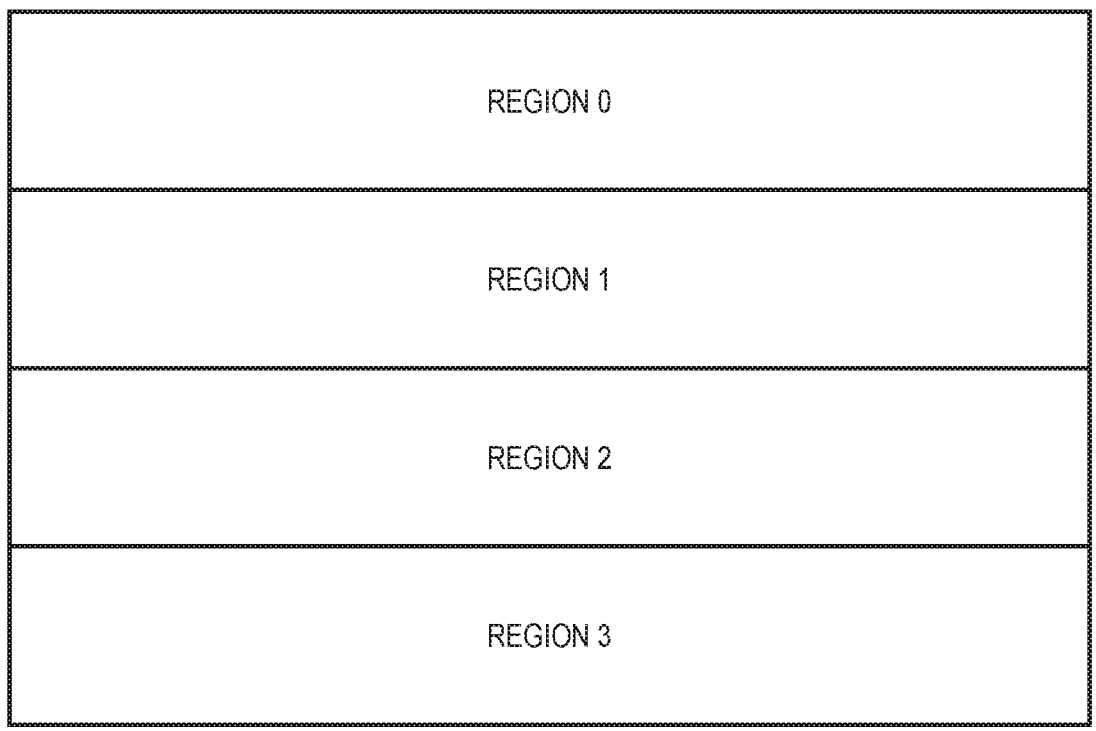
FIG. 4A is a diagram showing a region division method according to the first embodiment.

First, in the present embodiment, R, G1, G2 and B planes that constitute the frame of interest (RAW image data) are each divided into four equally in the vertical direction as shown in FIG. 4A. Note that, this number of divisions is not particularly limited, and may be other than four. In the embodiments, a target code amount is then set for each of the four regions. Also, the encoding result of an encoded region is used to calculate the target code amount of a subsequent non-encoded region (discussed in detail later). The initial target code amount setting unit 112 then sets the target code amount for each of these four regions. From the viewpoint of image quality, variation in the quantization parameter Qp between these four regions is desirably as small as possible.

In view of this, the initial target code amount setting unit 112 allocates a greater target code amount as the encoding difficulty of the region ascertained when encoding the previous frame that is temporally adjacent to the frame of interest increases, and allocates a lesser target code amount as the encoding difficulty of the region decreases.

Note that the encoding difficulty utilizes the code amount of encoded data generated when encoding that region. This is because the code amount of the encoded data of the region increases as the image becomes more complex.

Furthermore, the average value of the quantization parameters Qp used when encoding of block lines (defined later) within a region may also be taken into consideration. This is because an increase in the value of the quantization parameter represents an increase in the amount of encoded data. In this case, the difficulty of each region can be represented by the product of the code amount and the average value of the quantization parameters of that region.

A region determining unit 111 determines whether the block line of interest is a head block line of the region set in advance.

Next, the unit of control of the quantization parameter Qp will be described. As aforementioned, the input image is a RAW image in a Bayer array, and is separated into four planes by the plane transforming unit 101. DWT is then executed on each plane.

Figure 4B:
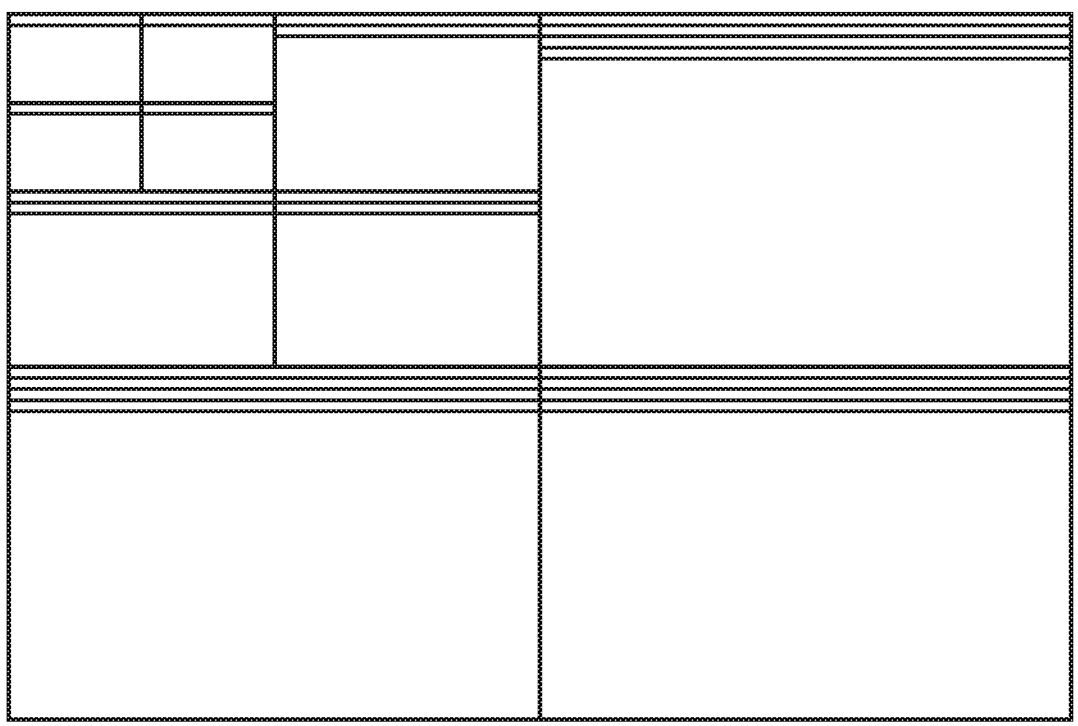
FIG. 4B is a diagram showing the relationship between sub-blocks and block lines.

While the unit of encoding is given as the coefficient lines of every sub-band, the unit of quantization control is given as a field of sets of the wavelet transform coefficients of sub-bands at the same pixel position. That is, as shown in FIG. 4B, one line of the sub-band {LL} and the sub-bands {Lv3HL, Lv3LH, Lv3HH} of disassembly level 3, two lines of the sub-bands {Lv2HL, Lv2LH, Lv3HH} of disassembly level 2, and four lines of the sub-bands {Lv1HL, Lv1LH, Lv1HH} of disassembly level 1 are given as units of control by the quantization parameter Qp for one execution. The set of corresponding transform coefficients within each sub-band which is the unit of control will henceforth be referred to as a block line (or simply block).

Note that 1 block line is equivalent to 16 lines of a RAW image which is the input frame and thus may straddle the boundary of the above four regions, although, in the present embodiment, the region is updated when all of the encoding within the region is completed.

Hereinafter, description returns to configurations other than the quantization control unit 105.

A produced code amount holding unit 106 holds the code amount of encoded data produced when each block line that is notified from the encoding unit 104 is encoded.

A target code amount calculator 110, in the case where the region determining unit 111 has judged that the timing for controlling Qp of the head block line of a region has arrived, calculates the block line target code amount block target code amount) of that region on the basis of the initial target code amount of every region that is notified from the initial target code amount setting unit 112. Also, the target code amount calculator 110, in the case where the scene change detecting unit 109 discussed later judges that there is a scene change, updates the block line target code amount. The target code amount calculation method will be discussed in detail later.

A difference calculator 107 calculates the difference between the produced code amount and the block line target code amount for every block line, and further calculates an integrated difference amount which is the integrated value of differences.

The quantization value calculator 108 calculates Qp, based on the integrated difference amount that is notified from the difference calculator 107. This calculation will be discussed in detail later.

The scene change detecting unit 109 detects (infers) whether or not there is a scene change in the block line of interest, based on the quantization parameter Qp calculated by the quantization value calculator 108 and the threshold that is notified from the scene change threshold setting unit 114 (discussed in detail later). The code amount is controlled as a result of the above.

Quantization Value Calculation

One quantization parameter calculation method is a well-known technology shown in MPEG-2 Test Model 5. According to Test Model 5, a quantization parameter Qp[i] of the pixel block of interest is calculated using the following equation (1) from an initial quantization parameter Qini and ΣE(i−1) that represents the integration of the differences between the code amounts in the pixel blocks from the head pixel block to the pixel block and the target code amount per pixel block, where the ith pixel block is the pixel block of interest.

$$Qp[i]=Qini+r\times\Sigma E \quad (1)$$

Here, r is the control sensitivity of the quantization parameter. The control sensitivity r is a parameter that causes Qp to vary more steeply as the value of r increases, while controllability of the code amount improves.

In the present embodiment, the block lines of the four divided regions are the units of encoding, and thus the quantization parameter Qp[i] of the block line of interest of the region of interest can be calculated as:

$$Qp[i]=Qp\_\text{ref}+r\times\Sigma E[i-1] \quad (2)$$

Here, Qp_ref is, in the region 0, the initial quantization parameter Qp_ini set by the initial quantization value setting unit 112, and is, in the other regions, the quantization parameter Qp of the last block line of the immediately previous region.

In the embodiments, the RAW image in a Bayer array is separated into R, G1, G2 and B planes. The values 0, 1, 2 and 3 for identifying each plane are allocated to the respective planes, and these values are represented as a variable pl. The ith block line of a color plane p is then represented as BL(pl,i). ΣE[i−1] of equation (2) has the meaning of the following equation, where C(BL(pl,i)) is the code amount of the block line BL(pl,i), and TC is the block line target code amount of the region of interest.

$$\Sigma E[i-1]=\Sigma\Sigma\{TC-C(BL(pl,k))\}$$

Here, ΣΣ represents the sum of pl=0, 1, 2, 3 and k=0, 1, 2, . . . , i−1.

The quantization value calculator 108 calculates the quantization parameter Qp for the block lines of the encoding target in accordance with equation (2), and after having further transformed the calculated quantization parameter Qp into the actual quantization parameter Qp(Qp[pl][sb]) of each sub-band, notifies the resultant quantization parameters to the quantizing unit 103. Note that pl and sb respectively indicate the plane and the sub-band. The quantization value calculator 108, as shown in equation (3), calculates the quantization parameter Qp(Qp[pl][sb]) of the sub-bands, by applying the quantization parameter Qp of the block line determined by equation (2) to a matrix mtx that is provided for every plane or sub-band set in advance.

$$Qp[pl][sb]=Qp[i]\times mtx[[pl][sb] \quad (3)$$

Here, sb is a variable specifying the type and disassembly level of the sub-band.

Generally, by performing code amount control with a higher Qp set for sub-bands of higher frequencies and a lower Qp set for sub-bands of lower frequencies, image quality degradation (quantization error) becomes difficult to perceive with the human eye, and the produced code amount is compressed more as the high frequency component of the image data increases, and encoding efficiency is improved. Thus, the matrix is set such that Qp increases for higher frequency sub-bands and decreases for lower frequency sub-bands.

Scene Change Detection and Target Code Amount Correction

Processing Flow

Figure 6:
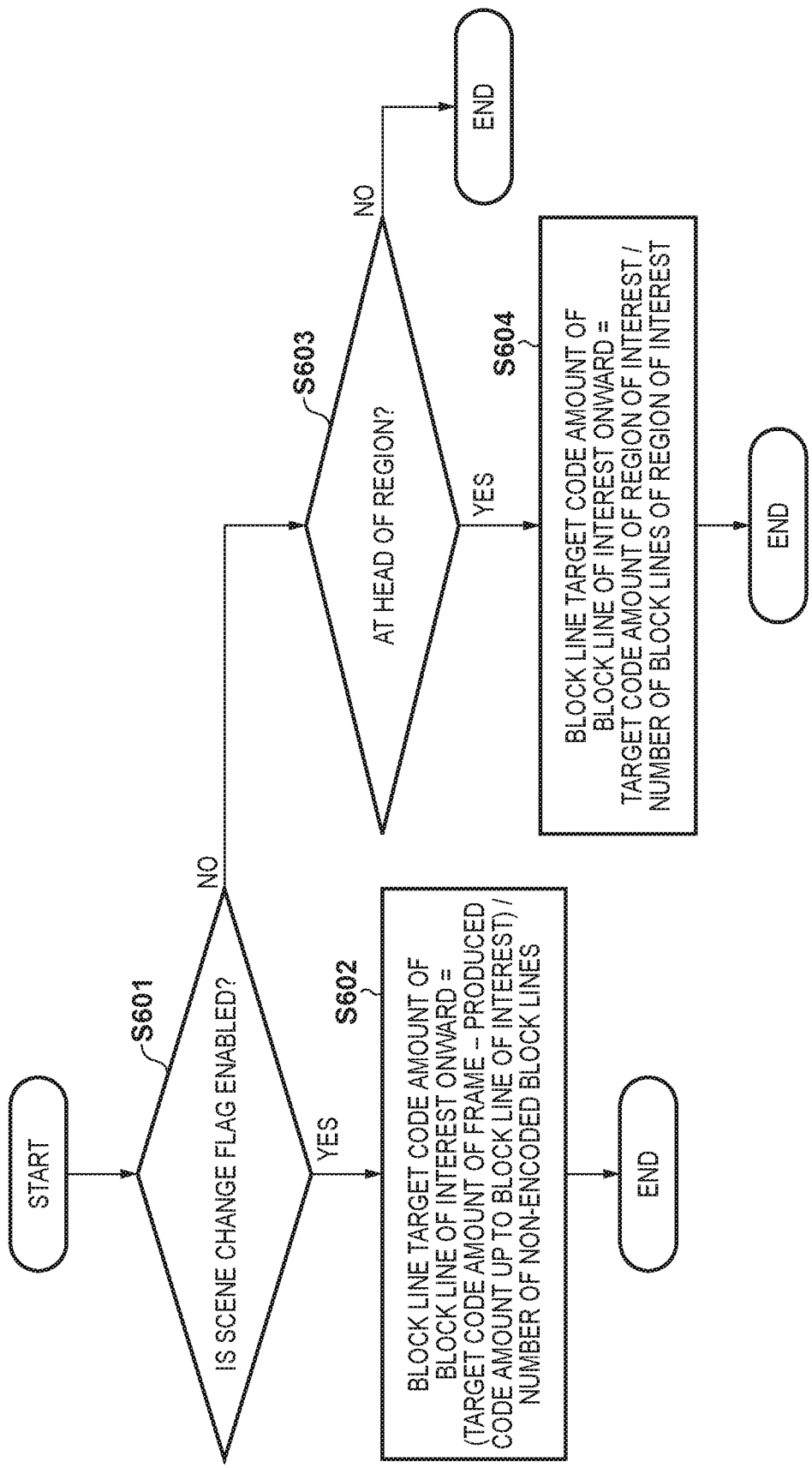
FIG. 6 is a processing flowchart of a target code amount calculator according to the first embodiment.

FIG. 5 is a flowchart showing the processing procedure of the scene change detecting unit 109 in the present embodiment. Also, FIG. 6 is a flowchart of the target code amount calculator 110 in the present embodiment. Hereinafter, a method for detecting a scene change and control after a scene change, which are features of the present embodiment, will be described with reference to FIGS. 5 and 6.

First, the method for detecting a scene change will be described, with reference to FIG. 5. Note that the scene change detecting unit 109 implements processing every block line. Note that a scene change flag in the flowchart is assumed to be initialized with a value indicating a disabled state (no scene change) at the start of encoding of the frame of interest.

In step S501, the scene change detecting unit 109 determines whether the scene change flag of the frame of interest is enabled. The scene change detecting unit 109 ends the processing if enabled, and advances the processing to step S502 if disabled.

In step S502, the scene change detecting unit 109 calculates the absolute value of the difference between the quantization parameter Qp of the block line of interest and the initial quantization parameter Qp(Qp_ini) of the region of interest. In step S503, the scene change detecting unit 109 then determines whether the calculated absolute value is greater than or equal to a scene change threshold for the initial quantization parameter Qp of the region of interest that is notified from the scene change threshold setting unit 114, and branches the processing to step S504 if the absolute value is greater than or equal to the scene change threshold, and ends the processing if the absolute value is less than the scene change threshold.

In step S504, the scene change detecting unit 109 sets the scene change flag to a value for indicating that there is a scene change.

The processing of the scene change detecting unit 109 in the embodiments is as described above. Next, the method for calculating the target code amount by the target code amount calculator 110 in the embodiments will be described, with reference to FIG. 6.

In step S601, the target code amount calculator 110 determines whether a value indicating that the scene change flag is enabled is set. The target code amount calculator 110 advances the processing to step S602 if a value indicating that the scene change flag is enabled is set, and branches to the processing to step S603 if this is not the case.

In step S602, the target code amount calculator 110 sets the block line target code amount of the block line of interest onward to a value obtained by dividing a residual code amount obtained by subtracting the produced code amount up to the block line of interest from the target code amount of the frame by the number of non-encoded block lines. This can be indicated with the following equation.

block line target code amount=(target code amount of frame of interest−produced code amount *up* to block line of interest)/number of *non*-encoded block lines For example, in the case where the block line of interest is located within "region 2", the block line target code amount calculated with the above equation is applied in encoding not only the block lines from the block of interest onward in "region 2" but also all of the block lines of the remaining "region 3".

In step S603, the target code amount calculator 110 determines whether the block line of interest is the head block line of the region of interest. The target code amount calculator 110 advances the processing to step S604 if the block line of interest is the head block line of the block of interest, and ends the processing if this is not the case.

In step S604, the target code amount calculator 110 determines the block line target code amount of the block line of interest onward in accordance with the following equation.

block line target code amount=target code amount of region of interest/number of block lines within region of interest Note that in the case where the block line of interest is located within "region 2", for example, the block line target code amount calculated with the above equation is applied in encoding block lines from the block of interest in "region 2" onward. If the scene change flag is subsequently not in an enabled state, the block line target code amount is again calculated in accordance with step S604 at the head of the region 3.

As described above, in the case where a scene change is detected, the method for calculating the target code amount is switched with the case where a scene change is not detected.

Effects

Figure 7:
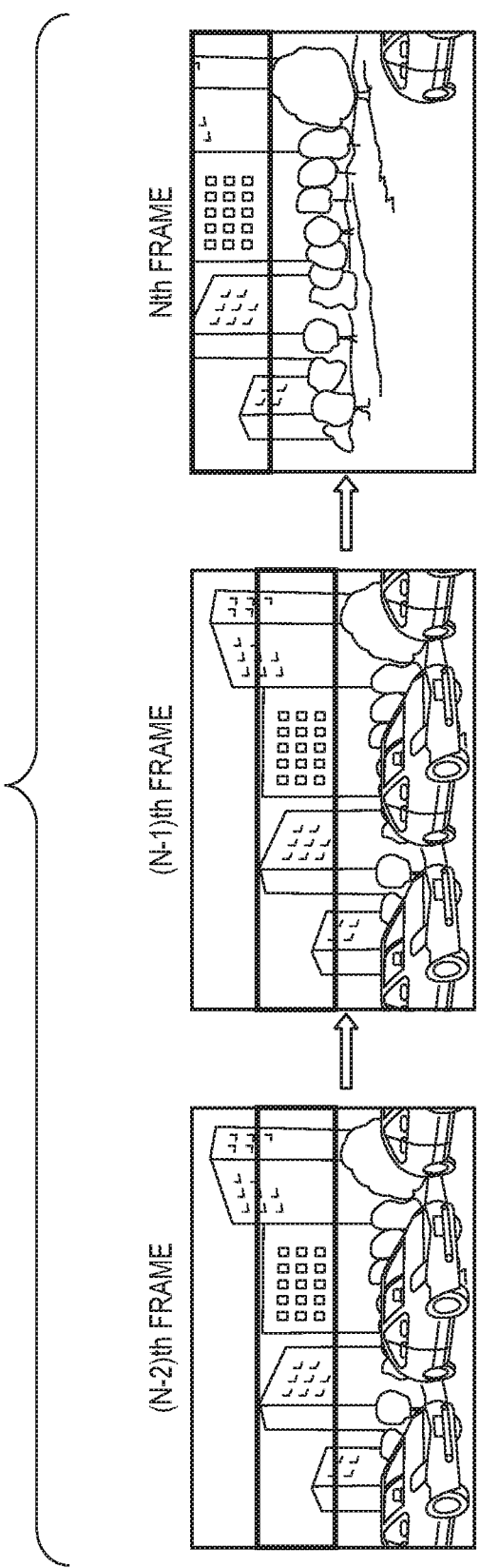
FIG. 7 is a diagram showing an exemplary moving image according to the first embodiment.

FIG. 7 shows an example of a moving image in order to show the effects of the present embodiment. In FIG. 7, an Nth frame is the frame of interest that is going to be encoded, the N−1th frame indicates the frame that is immediately previous to the frame of interest, and the N−2th frame indicates the frame that is two frames previous to the frame of interest.

In FIG. 7, the case where the correlation between the frames is very high up to the N−1th frame and a scene change occurs in the Nth frame is shown, with the grayed out region indicating the region where the encoding difficulty is high within the image.

Figure 8A:
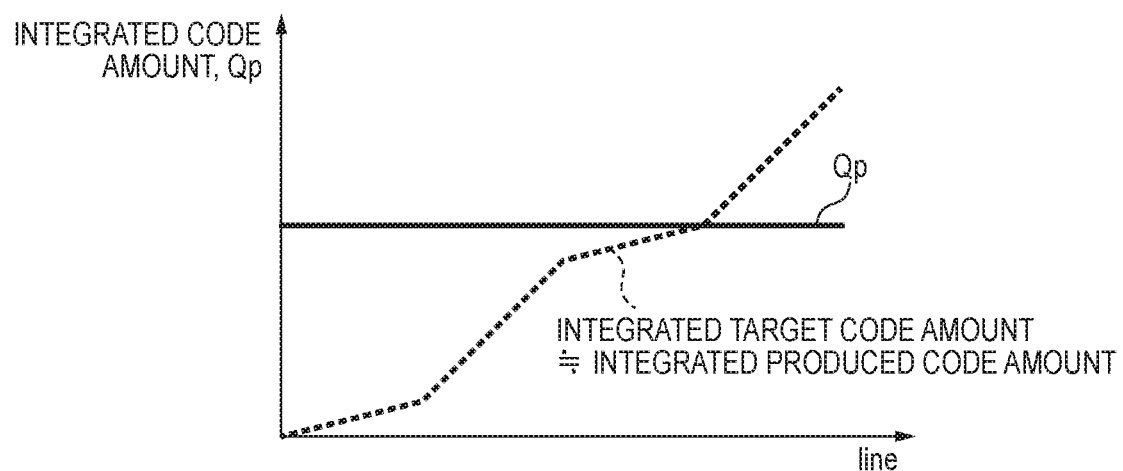
FIGS. 8A and 8B are diagrams illustrating the transition of a quantization parameter every frame.
Figure 8B:
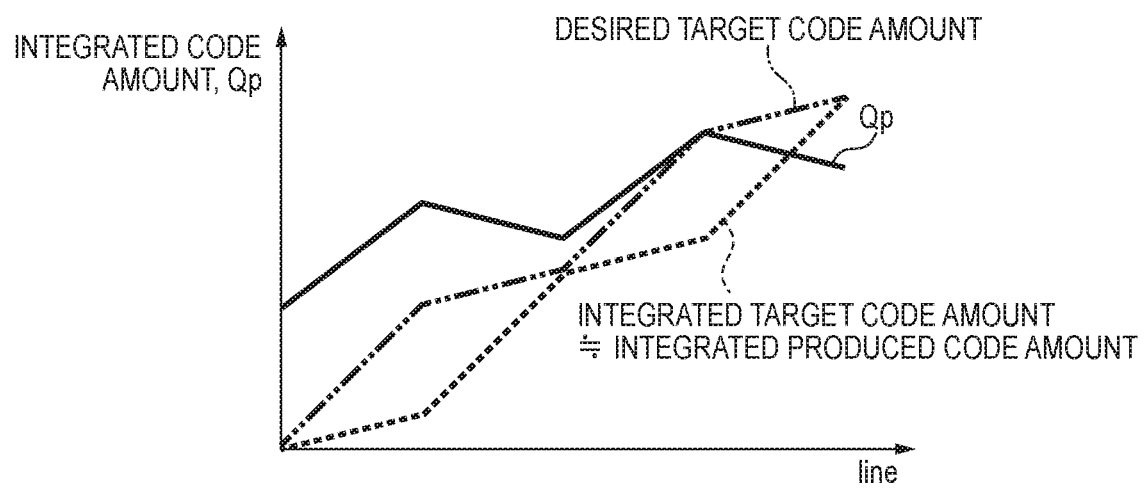

FIG. 8A is a diagram showing the transition of the target code amount and the quantization parameter Qp in the N−1th frame of FIG. 7 in the present embodiment, and FIG. 8B is a diagram showing the transition of the target code amount and the quantization parameter Qp in the Nth frame of FIG. 7 in case there is no scene change detection mechanism.

As shown in FIG. 8A, because the N−1th frame is highly correlated with the N−2th frame, the produced code amount approximates the target code amount in the case where the N−1th frame is encoded, and it is possible to encode the frame of interest with the quantization parameter Qp, with substantially no variation from the initial Qp.

However, as shown in FIG. 8B, in the case where the Nth frame is lowly correlated with the immediately previous N−1th frame, variation in the quantization parameter Qp occurs when there is no scene change detection mechanism.

Since the N−1th frame is an image in which the encoding difficulty of the regions alternates between relatively easy and difficult (i.e., easy, difficult, easy, difficult) from the upper region, the target code amount of the Nth frame that is calculated through feed-back is set to alternate between relatively small and large (i.e., small, large, small, large) from the upper region. However, the Nth frame is an image in which the actual encoding difficulty of the regions alternates between difficult and easy (i.e., difficult, easy, difficult, easy). The produced code amount tracks the erroneous target code amount and the quantization parameter Qp varies greatly, thus causing image quality degradation.

On the other hand, if the scene change mechanism of the present embodiment is utilized, it is possible to lessen the aforementioned image quality degradation.

Figure 9:
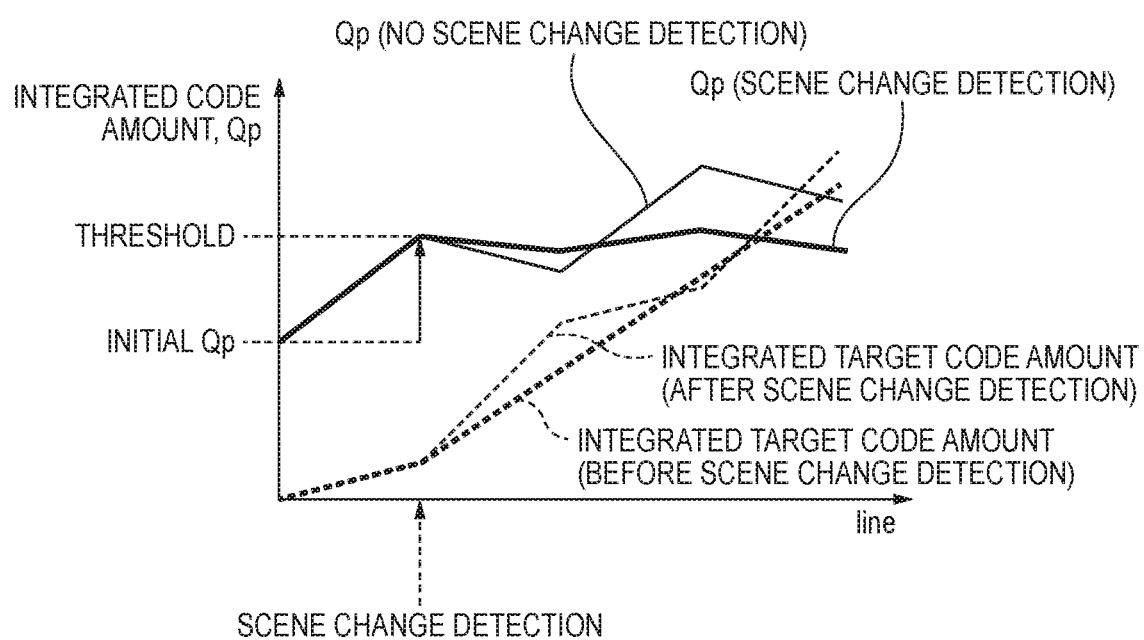
FIG. 9 is a diagram showing the transition of the target code amount and the quantization parameter that occurs in the case of applying a scene change detection mechanism according to the first embodiment.

FIG. 9 is a diagram showing the transition of the target code amount and the quantization parameter in the Nth frame of FIG. 7 that occurs in the case where the scene change detection mechanism of the present embodiment is applied.

As shown in FIG. 9, by applying the present embodiment and allocating the target code amount of block lines that have not yet been encoded equally to the respective block lines rather than hough feed-back in the case where the quantization parameter Qp varies more than a certain amount, the code amounts of the regions from the scene change onward are averaged out, and it becomes possible to secure an average image quality.

Note that since the scene change detection sensitivity increases when the scene change threshold for the initial quantization parameter Qp is too small and there is a risk of a scene change being detected even in frames in which control does not need to be changed, it is possible to effectively improve image quality, by setting the threshold in a range in which image quality degradation cannot be subjectively perceived, and implementing scene change detection such that the quantization parameter Qp does not vary outside that range.

As described above, the image quality of regions of the frame of interest that have not yet been encoded can be improved, by detecting scene changes according to the amount of variation of the quantization parameter serving as the encoding parameter within the screen, and switching the processing that is performed subsequent to a scene change being detected.

Note that setting the scene change threshold for the initial quantization parameter Qp that is set by the scene change threshold setting unit 114 to a smaller value as the initial quantization parameter Qp that is set in the frame of interest decreases is within the scope of the present embodiment.

In other words, a threshold T for scene change determination in the region of interest is determined by a function in which the initial quantization parameter Qp_ref of the region of interest is set as the argument.

$$T=F(Qp\_\text{ref})$$

The object of the present embodiment is to secure image quality. Thus, since the subjective image quality resulting from variation in the quantization parameter Qp in the encoding process is affected less as the initial quantization parameter Qp increases in the case where the initial quantization parameter Qp is small, scene changes are sensitively detected, and there is no need to switch to average image quality control.

Also, in the present embodiment, the N−1th frame after detection of a scene change was described as:

block line target code amount=(frame target code amount−produced code amount *up* to block line of interest)/number of *non*-encoded block lines However, the block line target code amount after detection of a scene change may be determined as represented in the following equation.

block line target code amount=(frame target code amount/total number of block lines of frame of interest)

In other words, the setting of the target code amount may be switched as if it was known from at the start of encoding where a scene change would occur.

Also, although the present embodiment describes an example in which the quantization parameter Qp increases from the initial quantization parameter Qp as encoding proceeds, the present invention is not limited thereto, and performing scene change detection even in the case where the quantization parameter Qp decreases as encoding proceeds is within the scope of the present embodiment. In the case where the quantization parameter Qp decreases, the image quality of the region encoded with that Qp appears to be favorable, but that is because too large of a target code amount was erroneously allocated, and it is highly likely that non-encoded regions will conversely have been allocated a smaller target code amount than expected. In non-encoded regions, the quantization parameter Qp could possibly increase in reaction to the quantization parameter Qp being reduced, and thus it is possible to detect a scene change and suppress image quality degradation at the end of a frame, even in the case where the quantization parameter Qp varies lower relative to the initial quantization parameter Qp.

The following are supplementary remarks relating to the configuration. The case where neither plane transformation nor DWT is performed is also within the scope of the present embodiment, in which case the plane transforming unit is equivalent to passing the input image downstream and regarding the DWT disassembly level to be 0. Also, there is no limitation to the minimum number of times that DWT is executed, and filtering until the plane is disassembled into a plurality of regions through DWT being, executed 4 or more times is also within the scope of the present embodiment. Also, there is consequently no particular limitation on the number of regions into which an input image is divided. Also, there is no limitation on the units of quantization control, and further dividing lines horizontally and sub-bands that are included in each block line differing every block line are also within the scope of the present embodiment.

Also, plane transformation need not involve separation into the color elements R, G1, G2 and B of a Bayer RAW image, and transformation into a plurality of planes composed of luminance information, color difference information and the like utilizing the color elements R, G1, G2 and B is also within the scope of the present embodiment. In that case, protecting the image quality of the luminance component whose degradation is readily perceived with the human eye, by setting Mtx shown in equation (3) such that the quantization parameter of the luminance plane takes a smaller value than the color difference plane, is also within the scope of the present embodiment.

Second Embodiment

Hereinafter, a second embodiment will be described. For an exemplary configuration of the second embodiment, refer to FIG. 1 similarly to the first embodiment. The second embodiment differs from the above first embodiment in that the scene change detecting unit 109 is able to utilize not only the initial quantization parameter Qp but also the quantization parameter Qp of an encoded block line that is at a position set in advance relative to the block line of interest, as reference quantization parameters Qp in the case of calculating the amount of variation to be utilized in scene change detection.

Processing Flow

Figure 10:
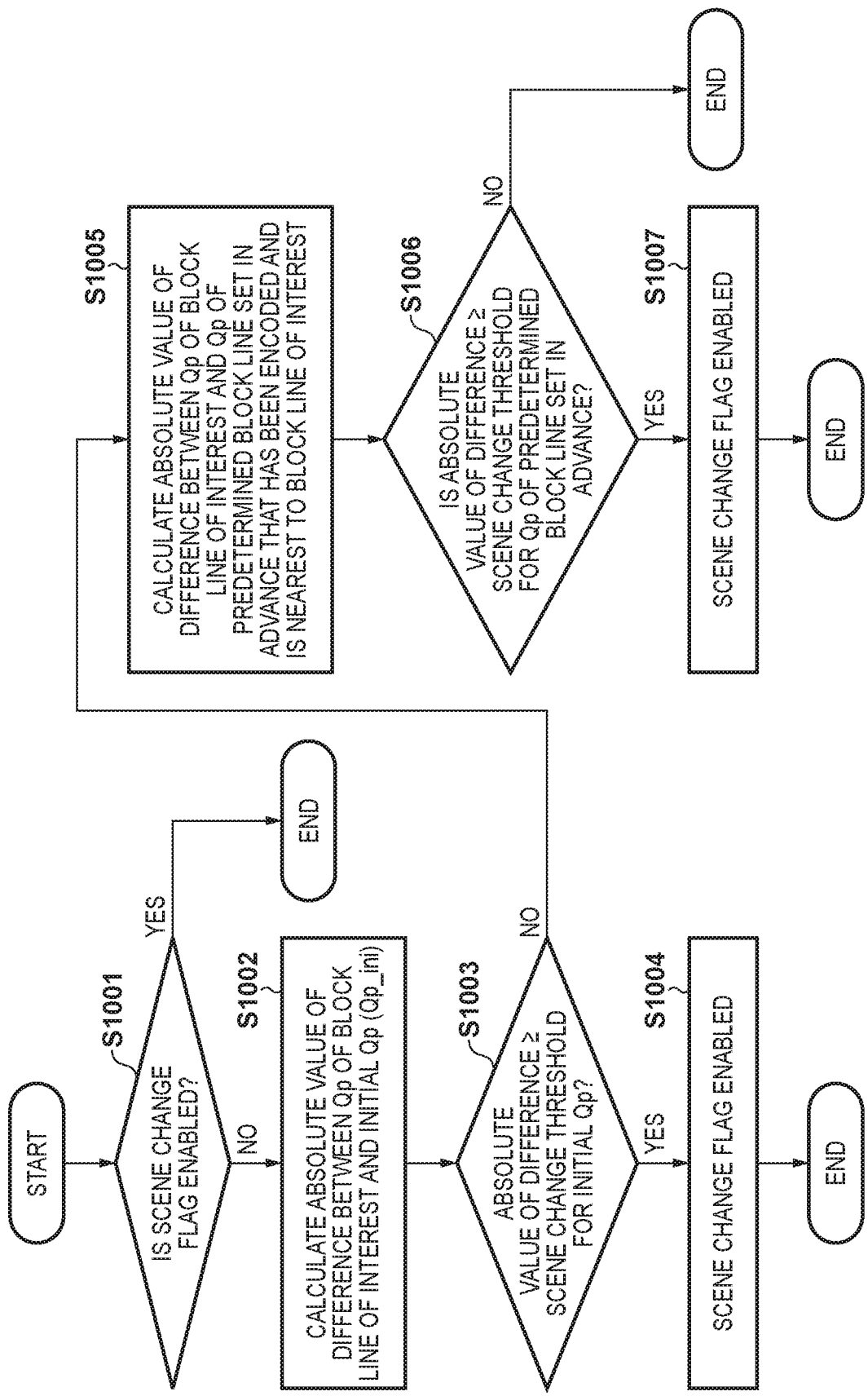
FIG. 10 is a processing flowchart of a scene change detecting unit according to a second embodiment.

FIG. 10 is a flowchart showing the contents of processing by the scene change detecting unit 109 in the second embodiment. Hereinafter, the method for detecting a scene change by the scene change detecting unit 109 will be described, with reference to FIG. 10. Note that the initialization state at the start of encoding of the frame of interest is similar to the first embodiment.

In step S1001, the scene change detecting unit 109 determines whether a value indicating enabled is stored in the scene change flag of the frame of interest. The scene change detecting unit 109 ends the processing if it is determined that a value indicating enabled is stored, and advances the processing to step S1002 if a value indicating disabled is stored.

In step S1002, the scene change detecting unit 109 calculates the absolute value of the difference between the quantization parameter Qp of the block line of interest and the initial quantization parameter Qp(Qp_ini) of the region to which the block line of interest belongs. Then, in step S1003, the scene change detecting unit 109 determines whether the absolute value calculated in step S1002 is greater than or equal to the scene change threshold for the initial quantization parameter Qp that is notified from the scene change threshold setting unit 114. The scene change detecting unit 109 advances the processing to step S1004, if it is determined that the absolute value is greater than or equal to the threshold. Also, the scene change detecting unit 109 branches the processing to step S1005, if it is determined that the absolute value is less than the threshold.

In step S1004, the scene change detecting unit 109 sets the scene change flag to a value representing enabled.

In step S1005, the scene change detecting unit 109 calculates the absolute value of the difference between the quantization parameter Qp that will be utilized in the block line of interest and the quantization parameter Qp used in a predetermined block line that has been encoded and is in a position set in advance relative to the block line of interest. Here, the block line that is immediately previous to the block line of interest is given as the relative position.

In step S1006, the scene change detecting unit 109 determines whether the absolute value calculated in step S1005 is greater than or equal to the scene change threshold for the quantization parameter Qp of the predetermined block line that is notified from the scene change threshold setting unit 114. The scene change detecting unit 109 branches the processing to step S1007 if it is determined that the absolute value is greater than or equal to the threshold, and ends the processing if this is not the case.

In step S1007, the scene change detecting unit 109 sets the scene change flag to a value representing enabled, and ends the processing.

Effects

Figure 11:
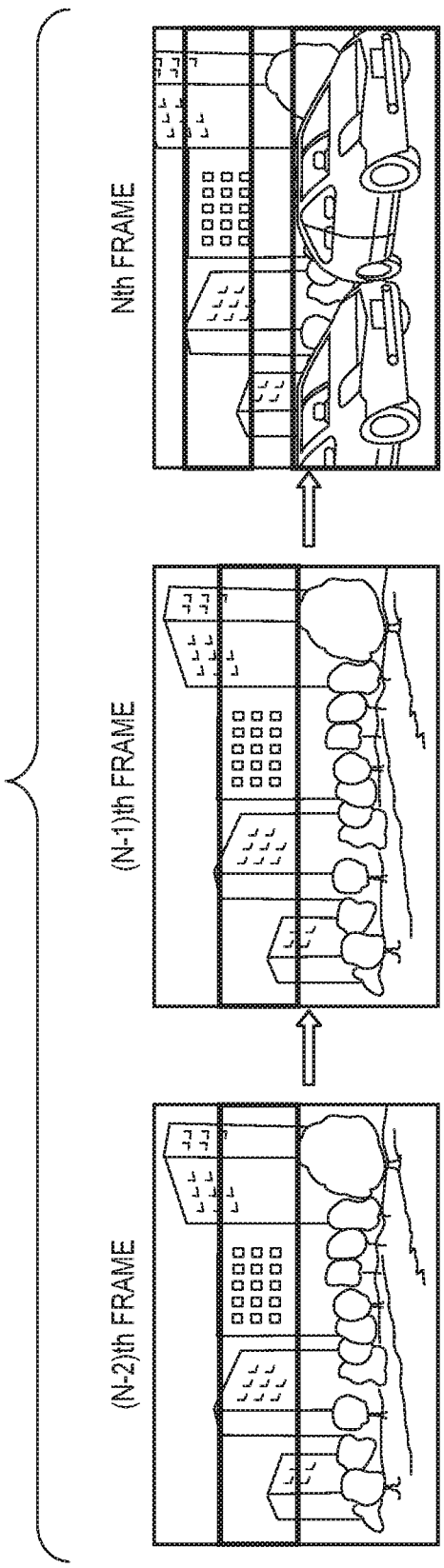
FIG. 11 is a diagram showing an exemplary moving image according to the second embodiment.

FIG. 11 shows an example of a moving image that is used in order to show the effects of the present embodiment. Similarly to FIG. 7, the case where the correlation between frames is very high up to the N−1th frame and a scene chance occurs in the Nth frame is similarly shown. The grayed out region indicates the region where the encoding difficulty is high within the image.

Depending on the moving image, there are also scene changes in which the features of the image change in part of the screen, rather the features changing in the entire frame.

Figure 12:
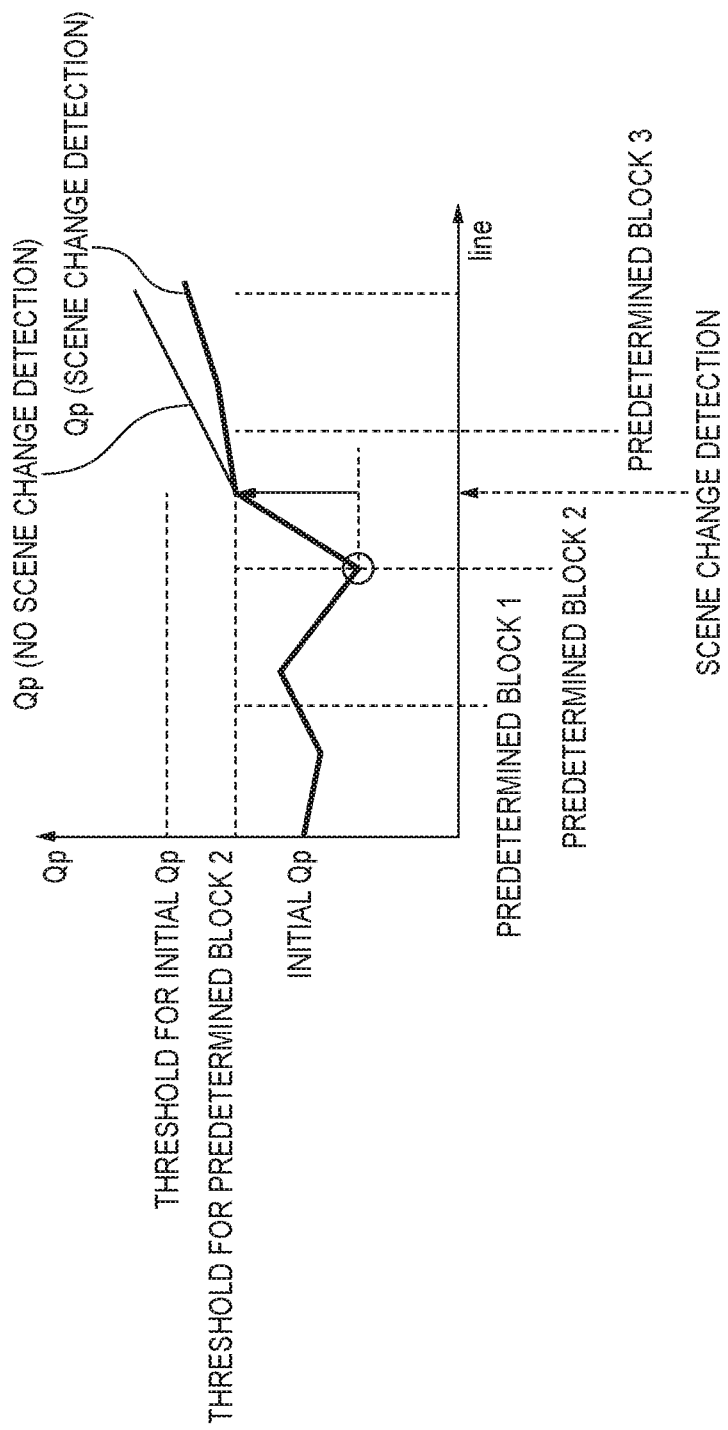
FIG. 12 is a diagram showing the transition of the target code amount and the quantization parameter in an Nth frame shown in FIG. 11 that occurs in the case of applying a scene change detection mechanism according to the second embodiment.

FIG. 12 is a diagram showing the transition of the target code amount and the quantization parameter in the Nth frame of FIG. 11 in the case of applying the scene change detection mechanism of the present embodiment.

In the Nth frame of FIG. 11, the features of the image have not changed very much in the upper region relative to the N−1th frame, and thus the quantization parameter Qp does not vary greatly. When the first embodiment is applied, either a scene change cannot be detected, or even if a scene change can be detected, scene change detection is implemented with the detection position being at the end of the screen, and thus the effect of detection decreases.

On the other hand, when the second embodiment is applied, as shown in FIG. 12, in addition to the effects of the first embodiment, a scene change can be detected by the amount of variation from the quantization parameter Qp of a block line (the immediately previous block line in the embodiments) that is at a certain relative position set in advance, rather than from the initial quantization parameter Qp of the region of interest. Rapid changes in scene at an intermediate position on the screen can also be handled, and image quality can be guaranteed, by enabling correction of the target code amount on a more timely basis.

As described above, by detecting a scene change according to the absolute value of the difference between the quantization parameter of a block line already encoded in the frame and the quantization parameter of the block line of interest, scene change detection with high detection accuracy can be performed even with rapid scene changes within the frame, and the image quality of regions of the frame of interest that have not yet been encoded can be improved.

Note that although there are no restrictions on the relationship between the scene change threshold for the initial quantization parameter Qp of the region of interest and the scene change threshold for the quantization parameter Qp of the predetermined block line, the scene change threshold for Qp of the predetermined block line is desirably smaller.

This is because the scene change threshold for the initial quantization parameter Qp realizes detection based on the correlation relationship between frames of the entire image, whereas the scene change threshold for Qp of the predetermined block line aims to detect a local scene change in a specific region, with the area of interested being small, and the amount of change in Qp also consequently being relatively small compared with the entire frame.

Third Embodiment

Next, a third embodiment will be described. The third embodiment differs from the first and second embodiments in that the accuracy of scene change detection is enhanced by providing two types of scene change detection mechanisms, and switching control according to the control sensitivity.

Configuration

Figure 13:
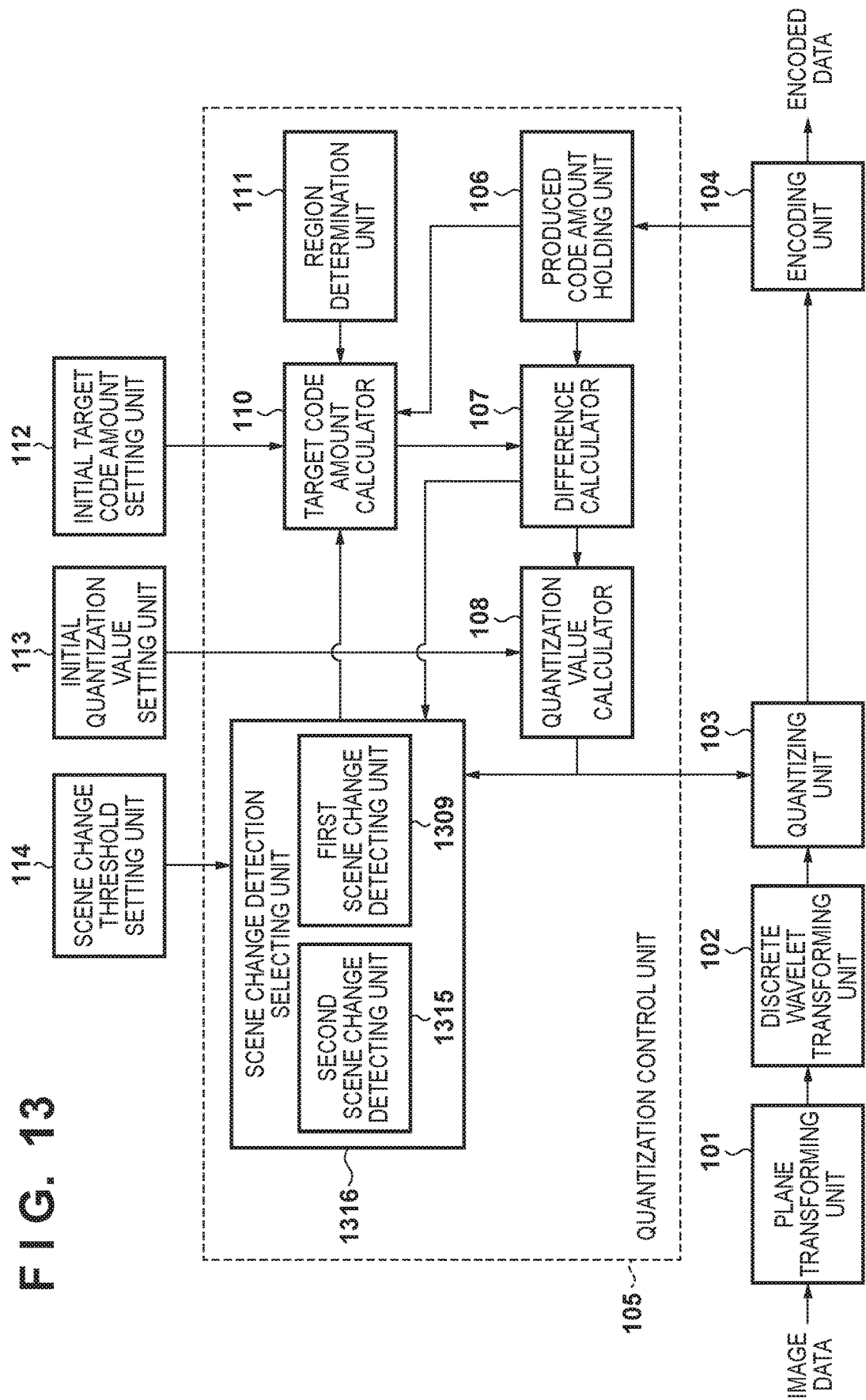
FIG. 13 is a block diagram showing an exemplary configuration of an image encoding apparatus according to a third embodiment.

FIG. 13 shows a block diagram of an image encoding apparatus according to the third embodiment. At the same time, the reference numerals 101 to 108 and 110 to 114 are the same as the exemplary configuration of the first embodiment.

A scene change detection selecting unit 1316 is constituted by a first scene change detecting unit 1309 and a second scene change detecting unit 1315. The first scene change detecting unit 1309 is assumed to be the same as the scene change detecting unit 109 of the first embodiment, and description thereof is omitted. Operations of the second scene change detecting unit 1315 and the scene change detection selecting unit 1316 will be discussed later in order.

Note that the scene change threshold setting unit 114 further notifies a scene change threshold (hereinafter, code amount scene change threshold) that is based on the code amount, and the difference calculator 107 further notifies an integrated difference amount to the scene change detection selecting unit 1316.

Operations of Second Scene Change Detecting Unit

Figure 14:
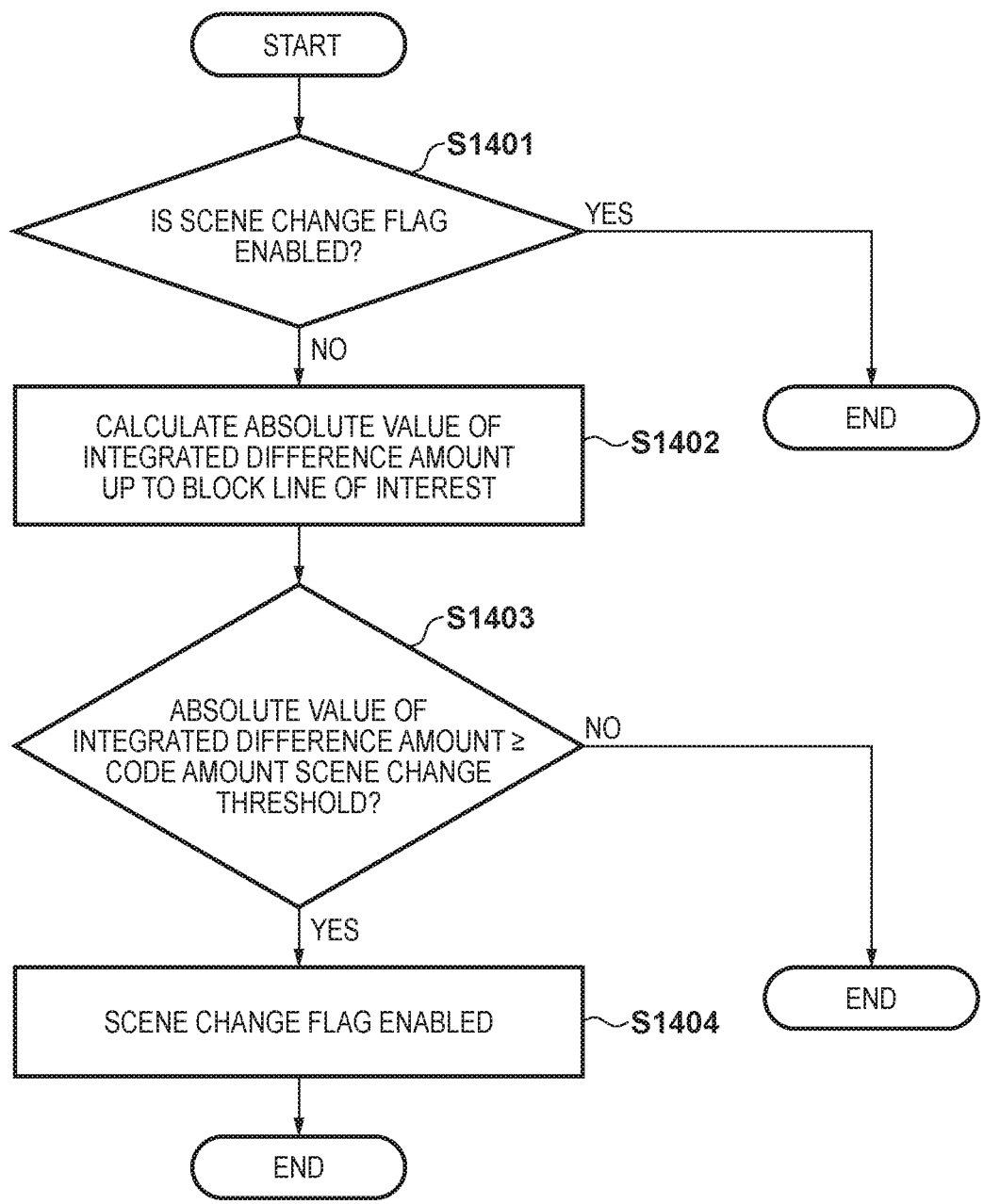
FIG. 14 is a processing flowchart of a second scene change detecting unit according to the third embodiment.

FIG. 14 shows a flowchart showing the processing procedure of the second scene change detecting unit 1315 in the third embodiment. Hereinafter, the scene change detection processing procedure by the second scene change detecting unit 1315 will be described, with reference to FIG. 14. Note that the initialization state at the start of encoding of the frame of interest is similar to the first embodiment.

In step S1401, the second scene change detecting unit 1315 determines whether a value indicating enabled is stored in the scene change flag of the frame of interest. If a value indicating enabled is stored in the scene change flag, the second scene change detecting unit 1315 ends the processing. Also, if a value indicating disabled is stored in the scene change flag, the second scene change detecting unit 1315 advances the processing to step S1402.

In step S1402, the second scene change detecting unit 1315 calculates the absolute value of the integrated value (hereinafter, simply integrated difference amount) of the difference between the code amount of encoded data obtained from each block line and the block line target code amount up to the block line of interest. This absolute value can, in short, be said to represent how much the code amount of the block line up to the block line of interest is shifted relative to the target code amount.

Then, in step S1403, the second scene change detecting unit 1315 compares the absolute value calculated in step S1402 with the code amount scene change threshold notified from the scene change threshold setting unit 114. The second scene change detecting unit 1315 advances the processing to step S1404 if the absolute value is greater than or equal to the threshold, and ends the processing if this is not the case.

In step S1404, the second scene change detecting unit 1315 enables the scene change flag. A scene change is detected as a result of the above.

Detection Effects of Second Scene Change Detecting Unit

In the third embodiment, effects of the second scene change detecting unit 1315 are described using the exemplary image of FIG. 7, similarly to the first embodiment.

Figure 15:
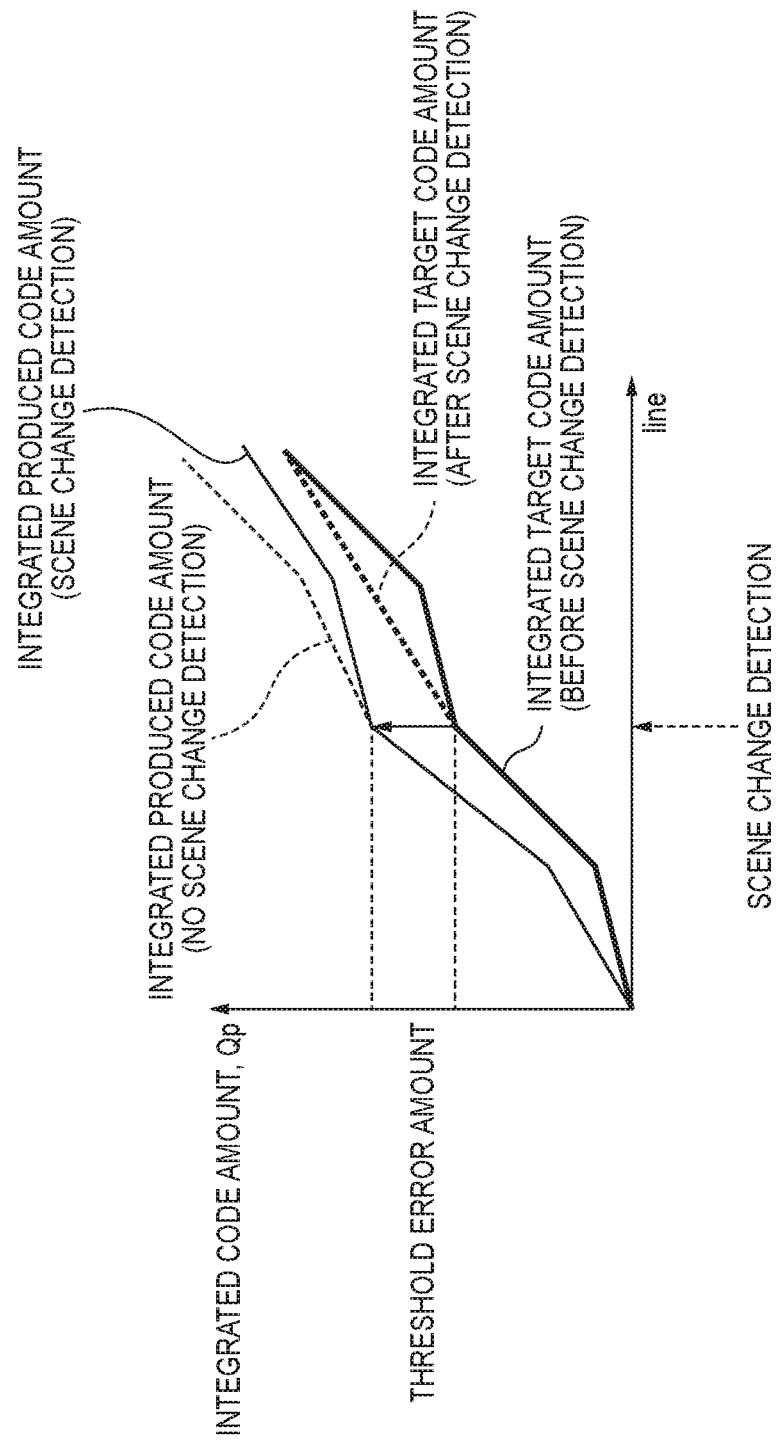
FIG. 15 is a diagram showing the transition of the target code amount and the produced code amount resulting from scene change detection in the second scene change detecting unit according to the third embodiment.

FIG. 15 is a diagram showing the relationship between the target code amount and the produced code amount in the Nth frame of FIG. 7 in the case where control sensitivity is low.

As shown in FIG. 15, in the case where the control sensitivity is low, the integrated code amount diverges from the integrated target code amount as encoding of the frame of interest proceeds, when scene change detection is not performed, and the integrated code amount when encoding of the frame of interest is completed exceeds the integrated target code amount, thus increasing the effect of image quality degradation on subsequent frames.

On the other hand, in the case where the absolute value of an integrated difference amount at or above a certain level increases as a result of implementing second scene change detection, it is possible to suppress the produced code amount, by allocating the subsequent target code amount equally to each block line. It should be apparent from the preceding description, however, that the quantization parameter Qp consequently varies, and the image quality of the frame of interest is affected to a certain extent.

Scene Change Detection Method and Effects Thereof

In the third embodiment, scene change detection is performed by both the first scene change detecting unit 1309 and the second scene change detecting unit 1315. The scene change detection selecting unit 1316, in the case where a value indicating enabled is stored in the scene change flag by either of these detecting units, then notifies that flag to the target code amount calculator 110 as a scene change flag.

For example, in the case where the control sensitivity r shown in equation (2) is high, the convergence of the code amount will be high, and thus scene change detection may not be possible with the second scene change detecting unit. Also, conversely in the case where the control sensitivity is low, the amount of the variation in the quantization parameter Qp within the frame of interest will be small, and thus scene change detection may not be possible with the first scene change detecting unit. However, by applying the third embodiment, one of the method using the variation amount of the quantization parameter Qp and the method using the produced code amount will be applied, thus enabling the scene change detection accuracy to be enhanced.

As described above, by adopting a configuration in which one of the scene change detection method using the variation amount of the quantization parameter Qp and the scene change detection method using the produced code amount is implemented, it is possible to enhance the scene change detection accuracy and secure the image quality of moving images in which the correlation between frames is low.

Note that selecting one of the first scene change detecting unit 1309 and the second detecting unit 1315 in advance before starting encoding of the frame of interest and only operating the selected detecting unit is also within the scope of the present embodiment.

For example, in the case of designating a high control sensitivity, only the first scene change detecting unit 1309 is driven in order to suppress image quality degradation of the frame of interest caused by variation in Qp. Also, in the case of designating a low control sensitivity, only the second scene change detecting unit 1315 is driven, in order to suppress image quality degradation of subsequent frames caused by the produced code amount being greater than expected in the frame of interest. This indicates switching the scene change detecting unit that uses such control sensitivity.

Since the detection method with which detection is facilitated differs according to the control sensitivity as aforementioned, it is possible to reduce power consumption by only operating the scene change detecting unit with which detection is facilitated in advance.

Although embodiments have been described in detail above, the present invention is not limited to specific embodiments, and various modifications and changes can be made within the scope defined by the claims. All or a plurality of the constituent elements of the aforementioned embodiments can be also be combined.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage meditun may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-23404, filed Feb. 13, 2018 which is hereby incorporated by reference herein in its entirety.

What is claimed is:

1. An image encoding apparatus for encoding moving image data captured by an image capturing unit, comprising:
a processor; and
a memory storing a program which causes the processor to function as:
a quantizing unit configured to quantize image data of a frame in the moving image data in accordance with a quantization parameter, every predetermined block set in advance;
an encoding unit configured to encode quantized data obtained by the quantizing unit;
a quantization control unit configured to control the quantization parameter such that a code amount produced by the encoding unit approaches a target code amount; and
a scene change detecting unit configured to detect whether there is a scene change in at least part of a frame,
wherein the scene change detecting unit calculates an absolute value of a difference between a quantization parameter of a block of a frame determined by the quantization control unit and a quantization parameter at a start of encoding of the frame, and detects a scene change based on the absolute value, and the quantization control unit has at least two control methods, applies a first quantization control method when starting encoding of a frame, and, in a case where the scene change detecting unit detects a scene change, switches to a second quantization control method that differs from the first quantization control method.

2. The apparatus according to claim 1, wherein the scene change detecting unit further detects a scene change according to an absolute value of a difference between a quantization parameter determined by the quantization control unit and a quantization parameter calculated at a predetermined position set in advance.

3. The apparatus according to claim 1, wherein the quantization control unit includes a target code amount calculator configured to calculate target code amounts of the predetermined blocks, and
in the second quantization control method, the target code amount calculator is controlled such that the target code amounts of the predetermined blocks that have not been encoded in the frame are equal to each other.

4. The apparatus according to claim 1, wherein, in the scene change detecting unit, the absolute value of the difference between the quantization parameters until a scene change is detected increases as the quantization parameter at the start of encoding of the frame decreases.

5. The apparatus according to claim 1, wherein the predetermined blocks are lines in which pixels are arranged.

6. The apparatus according to claim 1, wherein the program further causes the processor to function as:
a disassembling unit configured to disassemble image data of a frame in the moving image data into a plurality of planes; and
a transforming unit configured to perform a discrete wavelet transform on image data represented by each plane generated by the disassembling unit,
wherein the quantizing unit quantizes a transform coefficient generated by the transforming unit.

7. The apparatus according to claim 6, wherein an image represented by a frame in the moving image data is an image in a Bayer array, and
the disassembling unit disassembles four planes, each of a single color component, from one frame.

8. The apparatus according to claim 1, wherein an image represented by each frame of the moving image data is a RAW image.

9. A control method of an image encoding apparatus for encoding moving image data captured by an image capturing unit, the method comprising:
quantizing image data of a frame in the moving image data in accordance with a quantization parameter, every predetermined block set in advance;
encoding quantized data obtained in the quantization;
controlling the quantization parameter such that a code amount produced by the encoding approaches a target code amount; and
detecting whether there is a scene change in at least part of a frame,
wherein the detecting calculates an absolute value of a difference between a quantization parameter determined by the quantization control and a quantization parameter at a start of encoding of a frame and detects a scene change based on the absolute value, and
in the quantization control, there are at least two control methods, a first quantization control method is applied when starting encoding of a frame, and, in a case where a scene change is detected in the scene change detection, a second quantization control method that differs from the first quantization control method is switched to.

10. A non-transitory computer-readable storage medium storing a program which causes, when executed by a computer having an image capturing unit, the computer to execute steps of a control method of an image encoding apparatus for encoding moving image data captured by the image capturing unit, the method comprising:
quantizing image data of a frame in the moving image data in accordance with a quantization parameter, every predetermined block set in advance;
encoding quantized data obtained in the quantization;
controlling the quantization parameter such that a code amount produced by the encoding approaches a target code amount; and
detecting whether there is a scene change in at least part of a frame,
wherein the detecting calculates an absolute value of a difference between a quantization parameter determined by the quantization control and a quantization parameter at a start of encoding of a frame and detects a scene change based on the absolute value, and
in the quantization control, there are at least two control methods, a first quantization control method is applied when starting encoding of a frame, and, in a case where a scene change is detected in the scene change detection, a second quantization control method that differs from the first quantization control method is switched to.

* * * * *